United States Patent
Jacobmeier et al.

(10) Patent No.: US 12,043,694 B2
(45) Date of Patent: Jul. 23, 2024

(54) METHOD FOR PRODUCING POLYURETHANE HARD FOAM COMPOSITE ELEMENTS USING MANNICH POLYOLS

(71) Applicant: BASF SE, Ludwigshafen am Rhein (DE)

(72) Inventors: Olaf Jacobmeier, Lemfoerde (DE); Tobias Kaluschke, Lemfoerde (DE); Christian Renner, Lemfoerde (DE); Michael Thater, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 874 days.

(21) Appl. No.: 16/954,194

(22) PCT Filed: Dec. 11, 2018

(86) PCT No.: PCT/EP2018/084331
§ 371 (c)(1),
(2) Date: Jun. 15, 2020

(87) PCT Pub. No.: WO2019/121158
PCT Pub. Date: Jun. 27, 2019

(65) Prior Publication Data
US 2021/0163661 A1    Jun. 3, 2021

(30) Foreign Application Priority Data

Dec. 21, 2017 (EP) .................................. 17209668

(51) Int. Cl.
| | |
|---|---|
| *C08G 18/42* | (2006.01) |
| *C08G 18/16* | (2006.01) |
| *C08G 18/18* | (2006.01) |
| *C08G 18/22* | (2006.01) |
| *C08G 18/48* | (2006.01) |
| *C08G 18/54* | (2006.01) |
| *C08G 18/76* | (2006.01) |

(52) U.S. Cl.
CPC ....... *C08G 18/4213* (2013.01); *C08G 18/163* (2013.01); *C08G 18/18* (2013.01); *C08G 18/225* (2013.01); *C08G 18/4288* (2013.01); *C08G 18/4812* (2013.01); *C08G 18/4816* (2013.01); *C08G 18/4829* (2013.01); *C08G 18/4833* (2013.01); *C08G 18/546* (2013.01); *C08G 18/7664* (2013.01); *C08G 2110/0025* (2021.01)

(58) Field of Classification Search
CPC .............. C08G 18/4213; C08G 18/163; C08G 18/4812; C08G 18/4816; C08G 18/4833; C08G 18/546; C08G 18/7664; C08G 2110/0025; C08G 18/18; C08G 18/225; C08G 18/4288; C08G 18/4829
See application file for complete search history.

(56) References Cited

U.S. PATENT DOCUMENTS

2012/0264841 A1* 10/2012 Tomovic ............ C08G 18/2027
521/174

FOREIGN PATENT DOCUMENTS

| KR | 20160023050 A | 3/2016 |
|---|---|---|
| WO | 2017155863 A1 | 9/2017 |

OTHER PUBLICATIONS

International Search Report and Written Opinion for corresponding PCT/EP2018/084331 mailed Mar. 4, 2019, 7 pages.
European Search Report for related EP Patent Application No. 17209668.7, Issued on May 30, 2018, 3 pages. No English translation available.

* cited by examiner

*Primary Examiner* — Rabon A Sergent
(74) *Attorney, Agent, or Firm* — Armstrong Teasdale LLP

(57) ABSTRACT

The present disclosure relates to a method for producing rigid polyurethane foam composite elements, including at least one outer layer and a rigid polyurethane foam layer, by mixing (a) polyisocyanates with (b) compounds having at least two hydrogen atoms reactive with isocyanate groups, (c) optionally flame retardant(s), (d) blowing agent, (e) catalyst, and (f) optionally auxiliaries and adjuvants to form a reaction mixture, applying the reaction mixture to the outer layer, and curing it to form the rigid polyurethane foam. The present disclosure further relates to a rigid polyurethane foam composite element obtainable by such a method.

13 Claims, No Drawings

METHOD FOR PRODUCING POLYURETHANE HARD FOAM COMPOSITE ELEMENTS USING MANNICH POLYOLS

CROSS-REFERENCE TO RELATED APPLICATIONS

This application is a U.S. National Phase Application of PCT/EP2018/084331, filed on Dec. 11, 2018, which claims the benefit of priority to European Patent Application Number 17209668.7, filed Dec. 21, 2017, the entire contents of which are hereby incorporated by reference herein.

The present invention relates to a method for producing rigid polyurethane foam composite elements, comprising at least one outer layer and a rigid polyurethane foam layer, by mixing (a) polyisocyanates with (b) compounds having at least two hydrogen atoms reactive with isocyanate groups, (c) optionally flame retardant(s), (d) blowing agent, (e) catalyst, and (f) optionally auxiliaries and adjuvants to form a reaction mixture, applying the reaction mixture to the outer layer, and curing it to form the rigid polyurethane foam, where component (b) comprises at least one polyether alcohol (b1), prepared by alkoxylation of a starter or of a starter mixture having an average functionality of 4 to 8 and a hydroxyl number of 300 to 600 mg KOH/g, at least one aromatic Mannich condensate (b2), which may have been alkoxylated, preparable by reaction of an aromatic compound which on an aromatic ring carries at least one hydroxyl group and/or at least one group —NHR, where R is any organic radical or is hydrogen, one or more aldehydes and/or ketones, and one or more primary or secondary amines, at least one aromatic polyester polyol (b3), the fraction of aromatic Mannich condensate being greater than 5 wt % to less than 20 wt %, based on the total weight of component (b). The present invention further relates to a rigid polyurethane foam composite element obtainable by such a method.

Rigid polyurethane foams have a long history and are used primarily for heat and cold insulation, such as in refrigeration equipment, in hot water storage facilities, in district heating pipes, or in construction, such as in composite elements composed of outer layers and of a core made from rigid polyurethane foam.

The production of composite elements composed in particular of metallic outer layers and a core made from isocyanate-based foams, these elements frequently also being referred to as sandwich elements, on continuous double belt lines is presently implemented widely. As well as sandwich elements for coolstore insulation, elements for decorating exteriors of a wide variety of different buildings are becoming increasingly significant.

In some cases when producing the sandwich elements, unwanted air inclusions occur between the lower outer layer and the isocyanate-based foam, and are referred to as voids. These air inclusions between metal sheet and foam may cause the metal sheet to bulge and the exterior to lose its appeal when the elements are employed on exteriors, particularly in situations of sharp temperature fluctuation and when the outer layer is a dark shade of color. High surface quality with a low void count and also effective adhesion between outer layer and rigid polyurethane foam are therefore important factors in the production of sandwich elements.

For technical reasons it is often desirable to have a relatively low flame retardant content, or improved fire protection. The fire protection can be improved by using polyisocyanurate foam. Polyisocyanurate foam is commonly obtained by reaction of polyisocyanates with compounds having isocyanate-reactive hydrogen atoms, using a trimerization catalyst, of which ammonium carboxylate or alkali metal carboxylate is an example, at temperatures which need to be at least 60° C. Since polyisocyanurate foam also includes a high proportion of polyurethane bonds, the term "rigid polyurethane foam" also encompasses such polyisocyanurate foams.

A disadvantage of polyisocyanurate foams is their low adhesion to the outer layers, oftentimes necessitating the use of an adhesion promoter. Particularly in the case of thin sandwich elements having a thickness of 100 mm or less, moreover, it is not easy technically to ensure the required reaction temperatures, so causing the fire protection properties to deteriorate.

It was an object of the present invention, therefore, to afford a method for producing rigid polyurethane foam composite elements wherein even without using adhesion promoters the rigid polyurethane foam displays effective adhesion to the outer layer or layers and exhibits very good fire resistance even at processing temperatures—more particularly, at tooling and outer-layer temperatures—of less than 60° C.

This object has been achieved, surprisingly, by a method for producing rigid polyurethane foam composite elements, comprising at least one outer layer and a rigid polyurethane foam layer, by mixing (a) polyisocyanates with (b) compounds having at least two hydrogen atoms reactive with isocyanate groups, (c) optionally flame retardant(s), (d) blowing agent, (e) catalyst, and (f) optionally auxiliaries and adjuvants to form a reaction mixture, applying the reaction mixture to the outer layer, and curing it to form the rigid polyurethane foam, where component (b) comprises at least one polyether alcohol (b1), prepared by alkoxylation of a starter or of a starter mixture having an average functionality of 4 to 8 and a hydroxyl number of 300 to 600 mg KOH/g, at least one aromatic Mannich condensate (b2), which may have been alkoxylated, preparable by reaction of an aromatic compound which on an aromatic ring carries at least one hydroxyl group and/or at least one group —NHR, where R is any organic radical or is hydrogen, one or more aldehydes and/or ketones, and one or more primary or secondary amines, and at least one aromatic polyester polyol (b3), the fraction of aromatic Mannich condensate being greater than 5 wt % to less than 20 wt %, based on the total weight of component (b). The present invention further relates to a rigid polyurethane foam composite element obtainable by such a method.

In the production of the composite elements of the invention, a second outer layer is preferably used, so forming a sandwich element which has a top outer layer and a bottom outer layer and comprises rigid polyurethane foam in the intervening space. The method is to be suitable for continuous or discontinuous use. Discontinuous operation may come into question, for example, during start-up procedures of the double belt and for composite elements produced using discontinuous presses. Continuous application takes place when double belt lines are in use. In this double belt process, the reaction mixture is produced, for example, with high-pressure or low-pressure technology and is frequently applied to the lower outer layer using oscillating or stationary rake applicators. The upper outer layer is then applied to the fully reacting reaction mixture. This is followed by final curing to form the rigid polyurethane foam, preferably still within the double belt system. Such processes are known and are described for example in Kunststoffhandbuch, volume 7, "Polyurethane", Carl-Hanser-Verlag Munich, 3$^{rd}$ edition, 1993, sections 4.2.2, 6.2.2, and 6.2.3.

Outer layers used may be flexible or rigid, preferably rigid, outer layers, such as plasterboard panels, glass tiles, aluminum foils, aluminum, copper or steel sheets, preferably aluminum foils, aluminum sheets or steel sheets, more preferably steel sheets. These outer layers may also have been coated, with a conventional paint or varnish, for example. The outer layers may be coated or uncoated. The outer layers may be pretreated, by corona, arc lamp or plasma treatment, for example, or other customary techniques.

The outer layer in the double belt process is transported preferably with a constant velocity of 1 to 60 m/min, preferably 2 to 50 m/min, more preferably 2.5 to 30 m/min, and more particularly 2.5 to 20 m/min. Here, at least from the point at which the foam system is applied, the outer layer is in a horizontal position.

With the method of the invention, before the reaction mixture is applied to the lower outer layer, the outer layer— singular or plural—is preferably unwound from a roll, optionally provided with profiling, optionally heated, optionally pretreated to enhance foamability with polyurethane, and coated, optionally, with adhesion promoter. In the continuous double belt process, the reaction mixture is preferably cured within the double belt and, finally, trimmed to the desired length.

Polyisocyanates (a) contemplated are the conventional aliphatic, cycloaliphatic, and araliphatic and, preferably, the aromatic polyfunctional isocyanates. Polyfunctional isocyanates of these kinds are known per se or can be prepared by methods that are known per se. In particular, the polyfunctional isocyanates may also be used as mixtures, and so in that case component (a) comprises a variety of polyfunctional isocyanates. Polyfunctional isocyanates contemplated as polyisocyanate have two (hereinafter called diisocyanates) or more than two isocyanate groups per molecule.

Specific isocyanates include in particular the following: alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate, and, preferably, hexamethylene 1,6-diisocyanate; cycloaliphatic diisocyanates such as cyclohexane 1,3- and 1,4-diisocyanate and also any desired mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'-, and 2,4'-diisocyanate and also the corresponding isomer mixtures, and, preferably, aromatic polyisocyanates, such as tolylene 2,4- and 2,6-diisocyanate and the corresponding isomer mixtures, diphenylmethane 4,4'-, 2,4'-, and 2,2'-diisocyanate and the corresponding isomer mixtures, mixtures of diphenylmethane 4,4'- and 2,4'-diisocyanates, polyphenyl-polymethylene polyisocyanates, mixtures of diphenylmethane 4,4'-, 2,4'-, and 2,2'-diisocyanates, and polyphenyl-polymethylene polyisocyanates (crude MDI) and mixtures of crude MDI and tolylene diisocyanates.

Especially suitable are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyldiphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and dicyclohexylmethane 4,4'-, 2,4'- and/or 2,2'-diisocyanate.

Also frequently used are modified polyisocyanates, these being products which are obtained by chemical reaction of organic polyisocyanates and which have at least two reactive isocyanate groups per molecule. Included in particular are polyisocyanates containing ester, urea, biuret, allophanate, carbodiimide, isocyanurate, uretdione, carbamate and/or urethane groups, frequently also together with unreacted polyisocyanates.

The polyisocyanates of component (a) with particular preference comprise 2,2-MDI or 2,4'-MDI or 4,4'-MDI (also referred to as monomeric diphenylmethane diisocyanate or MMDI) or oligomeric MDI, which consists of higher polycyclic homologs of MDI having at least 3 aromatic rings and a functionality of at least 3, or mixtures of two or three of the aforesaid diphenylmethane diisocyanates, or crude MDI, which is obtained in the production of MDI, or, preferably, mixtures of at least one MDI oligomer and at least one of the aforementioned low molecular mass MDI derivatives 2,2-MDI, 2,4'-MDI or 4,4'-MDI (also referred to as polymeric MDI). The isomers and homologs of MDI are customarily obtained by distillation of crude MDI.

Polymeric MDI preferably comprises not only bicyclic MDI but also one or more polycyclic condensation products of MDI with a functionality of more than 2, more particularly 3 or 4 or 5. Polymeric MDI is known and is frequently referred to as polyphenyl-polymethylene polyisocyanate.

The average functionality of a polyisocyanate which comprises polymeric MDI may vary in the range from approximately 2.2 to approximately 4, more particularly from 2.4 to 3.8, and more particularly from 2.6 to 3.0. One particular such mixture of MDI-based polyfunctional isocyanates having different functionalities is the crude MDI which is obtained as an intermediate in the preparation of MDI.

Polyfunctional isocyanates or mixtures of two or more polyfunctional isocyanates based on MDI are known and are sold for example by BASF Polyurethanes GmbH under the name Lupranat® M20 or Lupranat® M50.

Component (a) comprises preferably at least 70, more preferably at least 90, and more particularly 100 wt %, based on the total weight of component (a), of one or more isocyanates selected from the group consisting of 2,2-MDI, 2,4'-MDI, 4,4'-MDI, and oligomers of MDI. The amount of oligomeric MDI here is preferably at least 20 wt %, more preferably greater than 30 to less than 80 wt %, based on the total weight of component (a).

The compounds (b) having at least two isocyanate-reactive hydrogen atoms comprise at least one polyether alcohol (b1), prepared by alkoxylation of a starter or a starter mixture having an average functionality of 4 to 8 and a hydroxyl number in the range between 300 and 600 mg KOH/g, at least one aromatic Mannich condensate (b2), which may have been alkoxylated, preparable by reaction of an aromatic compound which on an aromatic ring carries at least one hydroxyl group and/or at least one group —NHR, where R is any organic radical or is hydrogen, one or more aldehydes and/or ketones, and one or more primary or secondary amines, and at least one aromatic polyester polyol (b3). Further, component (b) may comprise chain extenders and/or crosslinking agents (b4), at least one polyether alcohol having a functionality of 2 to 4 and a hydroxyl number of 100 to less than 300 mg KOH/g (b5), and also other compounds, commonplace within polyurethane chemistry and having at least two isocyanate-reactive hydrogen atoms but not falling within the definition of the compounds (b1) to (b5). Such further compounds having isocyanate-reactive hydrogen atoms are known and are described in, for example, Kunststoffhandbuch, volume 7, "Polyurethane" Carl-Hanser-Verlag, Munich, 3$^{rd}$ edition, 1993, section 3.1 or 6.1.1.

Besides components (b1) to (b5), component (b) preferably comprises less than 20 wt %, more preferably less than 10 wt %, based in each case on the total weight of component (b), and more particularly no further compounds having at least two hydrogen atoms that are reactive with isocyanate groups. The average functionality of component (b) here is preferably 2.5 to 6.0, more preferably 3.0 to 4.5, and the hydroxyl number is preferably 250 to 450 mg KOH/g.

In one particularly advantageous embodiment, component (b) consists of a mixture of 20 to 60 wt %, more particularly 30 to 50 wt %, of one or more polyether alcohols (b1), greater than 5 to less than 20 wt %, more particularly 6 to 18 wt %, preferably 7 to 16 wt % of one or more aromatic Mannich condensates in alkoxylated or unalkoxylated form (b2), and 20 to 60 wt %, more particularly 30 to 50 wt %, of an aromatic polyester polyol (b3), based in each case on components (b1) to (b3).

In a more preferred embodiment, component (b) comprises 20 to 60 wt %, more particularly 30 to 50 wt %, of one or more polyether alcohols (b1), greater than 5 to less than 20 wt %, more particularly 6 to 18 wt %, preferably 7 to 16 wt % of one or more aromatic Mannich condensates in alkoxylated or unalkoxylated form (b2), 20 to 60 wt %, more particularly 30 to 50 wt %, of one or more aromatic polyester polyols (b3), 0 to 15 wt %, preferably 0 to 12 wt %, and more particularly 3 to 10 wt % of chain extenders and/or crosslinking agents (b4), and also 0 to 20 wt %, preferably 0 to 15 wt %, and more particularly 3 to 12 wt % of one or more polyether alcohols (b5), based in each case on the sum total of components (b1) to (b5).

The polyether alcohols b1) are customarily prepared by addition of alkylene oxides onto H-functional start substances. This process is common knowledge and is customary for the preparation of such products.

Start substances used may be alcohols or amines. Amines used may be aliphatic amines, such as ethylenediamine. In another embodiment of the invention, aromatic amines, especially tolylenediamine (TDA) or mixtures of diphenylmethanediamine and polyphenylene-polymethylene polyamines, may be used. Component b) comprises preferably at most 65 wt %, more preferably at most 40 wt %, based in each case on the weight of component b), of polyether alcohols based on aromatic amines.

In one particularly preferred embodiment of the invention, component b) contains no polyether alcohols based on aliphatic or aromatic amines.

For the preparation of the polyether alcohols b1), therefore, preferred H-functional start substances are polyfunctional alcohols.

These are, more particularly, alcohols with a functionality of 2 to 8. Examples thereof are glycols, such as ethylene glycol or propylene glycol, glycerol, trimethylolpropane, pentaerythritol, and also sugar alcohols, such as sucrose or sorbitol, in the form, for example, of mixtures of different alcohols with one another. The solid start substances such as sucrose and sorbitol are frequently mixed with liquid start substances, such as glycols or glycerol, in particular. Selective as a functionality of the starter substances in this case is a number-average functionality.

The polyols b1) are preferably prepared using mixtures of high-functionality alcohols and the alcohols already stated that are liquid at room temperature, more particularly glycerol. High-functionality alcohols used are preferably sugar compounds such as glucose, sorbitol, mannitol, and sucrose, polyhydric phenols, resoles, such as, for example, oligomeric condensation products of phenol and formaldehyde, and Mannich condensates of phenols, formaldehyde, and dialkanolamines, and also melamine. Particularly preferred are sugar alcohols, especially sucrose or sorbitol.

It has emerged that the use of polyether alcohols started with sorbitol brings advantages in processing and with regard to the properties of the foams. Hence there is better curing and an improved compressive stress.

Alkylene oxides used are preferably ethylene oxide, propylene oxide or mixtures of these compounds. Particularly preferred is the use of pure propylene oxide.

The addition of the alkylene oxides onto the start substance takes place preferably in the presence of catalysts. Catalysts used are mostly basic compounds, with the greatest technical significance being possessed by the oxides and more particularly the hydroxides of alkali metals or alkaline earth metals. It is usual to use potassium hydroxide as catalyst.

One embodiment of the invention uses amines as catalysts for preparing the polyether alcohols (b1). The amines in question are preferably those having at least one tertiary amino group, imidazoles, guanidines, or derivatives thereof. These aminic catalysts preferably have at least one group that is reactive with alkylene oxides, as for example a primary or secondary amino group or, more preferably, a hydroxyl group.

The polyetherol (b1) of the invention has a hydroxyl number of 300 to 600 mg KOH/g, preferably 350 to 550 mg KOH/g.

As an aromatic Mannich condensate (b2), which may have been alkoxylated, use is made of a Mannich condensate preparable by reaction of an aromatic compound which on an aromatic ring carries at least one hydroxyl group and/or at least one group —NHR, where R is any organic radical, an alkyl radical for example, or is hydrogen, one or more aldehydes and/or ketones, and one or more primary or secondary amines.

Examples of aromatic compounds which on an aromatic ring carry at least one hydroxyl group and/or at least one group —NHR are phenol, ortho-, para-, and meta-cresol, ethylphenol, nonylphenol, dodecylphenol, para-phenylphenol, 2-chlorophenol, 2,6-dichlorophenol, 2-bromophenol, 2-bromo-6-cyclohexylphenol, para-nitrophenol, 3,5-dimethylphenol, para-isopropylphenol, β-naphthol, hydroxyanthracene, substituted s-triazine compounds containing at least one amino group on the triazine ring, such as melamine, ammeline, ammelide, guanamine, and benzoguanamine, and also the various bisphenols, including 2,2-bis(4-hydroxyphenyl)propane (bisphenol A). Preferred are phenol, monoalkyl phenols having 1 to 10 carbon atoms, and bisphenol A; particularly preferred compounds are bisphenol A and nonylphenol.

Examples of the aldehydes and/or ketones suitable for preparing the Mannich condensate (b2) are formaldehyde, acetaldehyde, benzaldehyde, cyclohexanone, acetophenone, indanone, acetylnaphthalene, and also 1- and 2-tetralone; formaldehyde is used with particular preference.

Examples of the primary or secondary amines suitable for preparing the Mannich condensate (b2) are monoethanolamine, diethanolamine, isopropanolamine, diisopropanolamine, hydroxyethylamine, ethanolisopropanolamine, ethanol-2-hydroxybutylamine, isopropanol-2-hydroxybutylamine, isopropanol-2-hydroxyhexylamine, ethanol-2-hydroxyhexylamine, bis(2-hydroxypropyl)amine, N-hydroxyethylpiperazine, N-hydroxybutylamine, N-hydroxyethyl-2,5-dimethylpiperazine; diethanolamine is particularly preferred.

The Mannich condensates used within component (b2) may also have been alkoxylated. The alkoxylation takes place by known methods, as already described in connection with the preparation of component (b1). Preferred alkylene oxides here are ethylene oxide, 1,2-propylene oxide, 1,3-propylene oxide, 1,2- and 2,3-butylene oxide, tetrahydrofuran, and styrene oxide, preferably ethylene oxide and 1,2-propylene oxide, more particularly 1,2-propylene oxide. The alkylene oxides may be used individually, alternatingly in succession, or as mixtures. In one particularly preferred embodiment the fraction of 1,2-propylene oxide, based on the total weight of alkylene oxide used for alkoxylating the Mannich condensate b2), is at least 50 wt %, preferably at least 80 wt %, more preferably at least 90 wt %, and more particularly 100 wt %.

The aromatic Mannich condensate polyols used within component (b2) preferably have a functionality of 2 to 6 and more preferably of 3 to 5. The OH number of the aromatic Mannich condensate polyols (b2) is preferably from 200 to 650 and more preferably from 300 to 550 mg KOH/g.

In one preferred embodiment the Mannich base is synthesized from aromatic compounds p-nonylphenol and/or phenol and/or bisphenol A, the secondary amines diethanolamine and/or diisopropanolamine, and formaldehyde. In one particularly preferred embodiment the Mannich base described is alkoxylated.

In accordance with the invention, component (b) comprises at least one aromatic polyester polyol (b3). Suitable polyester polyols (b3) may be prepared preferably from aromatic dicarboxylic acids, or mixtures of aromatic and aliphatic dicarboxylic acids, more preferably exclusively from aromatic dicarboxylic acids and polyhydric alcohols. In place of the free dicarboxylic acids it is also possible to use the corresponding dicarboxylic acid derivatives, such as, for example, dicarboxylic esters of alcohols having 1 to 4 carbon atoms, or dicarboxylic anhydrides.

Aromatic dicarboxylic acids or aromatic dicarboxylic acid derivatives used are preferably phthalic acid, phthalic anhydride, terephthalic acid and/or isophthalic acid, in a mixture or alone, preference being given to using phthalic acid, phthalic anhydride, and terephthalic acid. Particularly preferred is the use of terephthalic acid or dimethyl terephthalate, especially terephthalic acid. Aliphatic dicarboxylic acids may be used in a mixture with aromatic dicarboxylic acids in a minor role. Examples of aliphatic dicarboxylic acids are succinic acid, glutaric acid, adipic acid, suberic acid, azelaic acid, sebacic acid, decanedicarboxylic acid, maleic acid, and fumaric acid.

Examples of polyhydric alcohols are as follows: ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, and pentaerythritol, and/or their alkoxylates.

Preference is given to using ethylene glycol, diethylene glycol, propylene glycol, glycerol, trimethylolpropane, and/or their alkoxylates, or mixtures of at least two of the stated polyols.

One specific embodiment of the invention also uses as polyhydric alcohol a polyether alcohol which is a reaction product of glycerol and/or trimethylolpropane with ethylene oxide and/or propylene oxide, preferably with ethylene oxide, the OH number of the polyether alcohol being in the range between 500 to 750 mg KOH/g. This results in improved storage stability of component (b3).

The polyester polyols (b3) are prepared preferably using not only the aromatic dicarboxylic acids or derivatives thereof and the polyhydric alcohols but also at least one fatty acid or fatty acid derivative, preferably a fatty acid.

The fatty acids may contain hydroxyl groups. Furthermore, the fatty acids may contain double bonds.

In one embodiment of the invention, the fatty acid preferably contains no hydroxyl groups.

The average fatty acid content of components (b3) here is preferably greater than 1 wt %, more preferably greater than 2.5 wt %, more preferably greater than 4 wt %, and very preferably greater than 5 wt %, based on the weight of components b3).

The average fatty acid content of component (b3) is preferably lower than 30 wt %, more preferably lower than 20 wt %, based on the total weight of components b3).

The fatty acid or fatty acid derivative is preferably a fatty acid or fatty acid derivative based on renewable raw materials selected from the group consisting of castor oil, polyhydroxy fatty acids, ricinoleic acid, hydroxyl-modified oils, grapeseed oil, black cummene oil, pumpkin kernel oil, borage seed oil, soybean oil, wheatgerm oil, rapeseed oil, sunflower seed oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, hydroxyl-modified fatty acids and fatty acid esters based on myristoleic acid, palmitoleic acid, oleic acid, vaccenic acid, petroselinic acid, gadoleic acid, erucic acid, nervonic acid, linoleic acid, linolenic acid, stearidonic acid, arachidonic acid, timnodonic acid, clupanodonic acid, and cervonic acid.

Preferred for use as fatty acid is oleic acid.

To prepare the polyester polyols (b3), the aliphatic and aromatic polycarboxylic acids and/or derivatives thereof and polyhydric alcohols may be subjected to polycondensation without catalyst or, preferably, in the presence of esterification catalysts, usefully in an atmosphere of an inert gas such as nitrogen, in the melt at temperatures of 150 to 280° C., preferably 180 to 260° C., optionally under reduced pressure, with reaction proceeding until the desired acid number is obtained, which is advantageously less than 10, preferably less than 2. According to a preferred embodiment, the esterification mixture is subjected to polycondensation at the above-stated temperatures until the acid number is 80 to 20, preferably 40 to 20, under atmospheric pressure, and is subsequently polycondensed under a pressure of less than 500 mbar, preferably 40 to 400 mbar. Esterification catalysts contemplated include, for example, iron, cadmium, cobalt, lead, zinc, antimony, magnesium, titanium, and tin catalysts, in the form of metals, metal oxides or metal salts. Alternatively, the polycondensation may be carried out in liquid phase in the presence of diluents and/or azeotrope formers, such as benzene, toluene, xylene or chlorobenzene, for example, for the azeotropic removal of the condensation water by distillation.

To prepare the polyester polyols (b3), the organic polycarboxylic acids and/or derivatives thereof and polyhydric alcohols are subjected to polycondensation advantageously in a molar ratio of 1:1 to 2.3, preferably 1:1.05 to 2.2, and more preferably 1:1.1 to 2.1.

The polyester polyol (b3) preferably has a number-weighted average functionality of greater than or equal to 2, more preferably of greater than 2, very preferably of greater than 2.2, and more particularly of greater than 2.3, resulting in a higher crosslinking density of the polyurethane prepared therewith and hence to better mechanical properties on the part of the polyurethane foam. With particular preference the number-average functionality of the polyester polyol (b3) is less than 4, more particularly less than 3.

The polyester polyols (b3) obtained generally have a number-average molecular weight of 200 to 2000 g/mol, preferably 300 to 1000 g/mol, and more particularly 400 to 700 g/mol. The OH number of the polyester polyols (b3) is preferably 100 to 800, more preferably from 600 to 150, and more particularly from 400 to 200 mg KOH/g.

Furthermore, component (b) may comprise chain extenders and/or crosslinking agents (b4), for the purpose, for example, of modifying the mechanical properties, such as the hardness. Chain extenders and/or crosslinking agents used are diols and/or triols and also amino alcohols having molecular weights of less than 280 g/mol, preferably 62 to 250 g/mol, more preferably 62 to 200 g/mol, more preferably still 62 to 150 g/mol, and more particularly from 60 to 130 g/mol. Examples contemplated include aliphatic, cycloaliphatic and/or araliphatic diols having 2 to 8, preferably 2 to 6, carbon atoms, such as ethylene glycol, 1,2-propylene glycol, diethylene glycol, dipropylene glycol, 1,3-propanediol, 1,4-butanediol, 1,6-hexanediol, o-, m-, and p-dihydroxycyclohexane, bis(2-hydroxyethyl)hydroquinone. Also contemplated are aliphatic and cycloaliphatic triols such as glycerol, trimethylolpropane, and 1,2,4- and 1,3,5-trihydroxycyclohexane.

Where chain extenders, crosslinking agents or mixtures thereof are employed in producing the rigid polyurethane foams, they are used usefully in an amount of 0 to 15 wt %, preferably of 0 to 5 wt %, based on the total weight of component (B). Component (B) comprises preferably less than 2 wt % and more preferably less than 1 wt % of, and more particularly no, chain extenders and/or crosslinking agents (b4).

As polyether alcohol (b5) it is possible to use a polyether alcohol having a functionality of 2 to 4 and an OH number of 100 to less than 300 mg KOH/g. Polyether alcohols (b5) may be prepared in analogy to the polyether alcohols (b1), with the starter molecules used being compounds having a functionality of 2 to 4. Examples of starter molecules which can be used for preparing the polyether alcohols (b5) are compounds containing hydroxyl groups or amine groups, examples being selected from the group consisting of ethylene glycol, diethylene glycol, glycerol, trimethylolpropane, pentaerythritol, methylamine, ethylamine, isopropylamine, butylamine, benzylamine, aniline, toluidine, toluenediamine (TDA), naphthylamine, ethylenediamine, 4,4"-methylenedianiline, 1,3-propanediamine, 1,6-hexanediamine, ethanolamine, diethanolamine, triethanolamine, and also other alcohols with a hydricity of two to 4 or amines with a functionality of one or two, and also any desired mixtures thereof. Preference is given to using ethylene glycol, diethylene glycol, glycerol, trimethylolpropane and/or pentaerythritol.

In the context of the invention, functionality of the polyether alcohols is assumed to be the theoretical functionality, based on the functionality of the starter molecules. Where mixtures of starter molecules differing in functionality are used, the resulting functionalities may be fractional numbers. Effects on the functionality, owing for example to side reactions, are discounted for the purposes of the nominal functionality.

One preferred embodiment of the invention additionally uses a flame retardant c). The flame retardant c) is used preferably in an amount of 10 to 45 wt %, more preferably 20 to 45 and more particularly 22 to 30 wt %, based on the total weight of components b) and c).

The flame retardant c) may comprise hydrogen atoms reactive with isocyanate groups. In one preferred embodiment of the invention, the flame retardant contains no hydrogen atoms reactive with isocyanate groups.

Preferred for use are flame retardants c) which comprise at least one phosphorus atom in the molecule.

The products in question may preferably be those characterized in more detail below.

One preferred group are phosphorus-containing compounds having a molecular weight of less than 400 g/mol, specifically with one phosphorus atom in the molecule. Phosphonates and/or phosphates are preferred. Particularly preferred are phosphates and phosphonates selected from the group containing diethyl ethanephosphonate (DEEP), tris(2-chloroisopropyl) phosphate (TCPP), dimethyl propylphosphonate (DMPP), and triethyl phosphate (TEP), more preferably from the group containing TCPP and (TEP), for use. These compounds are used preferably in an amount of 5 to 40 wt %, based on the sum total of the masses of b) and d).

Blowing agents (d) used may be chemical and physical blowing agents. Chemical blowing agents are compounds which react with isocyanate groups and, in so doing, give off gases, especially carbon dioxide, or carbon dioxide and carbon monoxide. Usually they comprise water and/or formic acid, preferably water.

In place of or in combination with the chemical blowing agents it is also possible to use what are called physical blowing agents. These are compounds which are inert toward the ingredient components and which are usually liquid at room temperature and which evaporate under the conditions of the urethane reaction. The boiling point of these compounds is preferably below 50° C. The physical blowing agents also include compounds which are gaseous at room temperature and which are incorporated into or dissolved in the ingredient components under pressure, examples being carbon dioxide, low-boiling alkanes and fluoroalkanes.

The blowing agents are mostly selected from the group containing water, formic acid, alkanes and/or cycloalkanes having at least 4 carbon atoms, dialkyl ethers, esters, ketones, acetals, fluoroalkanes having 1 to 8 carbon atoms, and tetraalkylsilanes having 1 to 3 carbon atoms in the alkyl chain, more particularly tetramethylsilane.

Physical blowing agents might include, by way of example, propane, n-butane, isobutane and cyclobutane, n-pentane, isopentane and cyclopentane, cyclohexane, dimethyl ether, methyl ethyl ether, methyl butyl ether, methyl formate, acetone, and also fluoroalkanes which can be broken down in the troposphere and are therefore harmful for the ozone layer, such as trifluoromethane, difluoromethane, 1,1,3,3,3-pentafluoropropene, 1,1,1,3,3-pentafluorobutane, 1,1,1,3,3-pentafluoropropane, 1,1,1,2-tetrafluoroethane, 1,1,1,2,3-pentafluoropropene, 1-chloro-3,3,3-trifluoropropene, difluoroethane, and heptafluoropropane. The stated physical blowing agents may be used alone or in any desired combinations with one another.

Particularly preferred physical blowing agents are fluoroalkanes and/or hydrocarbons, more preferably aliphatic or cycloaliphatic hydrocarbons having 4 to 8 carbon atoms, and more particularly pentane, such as n-pentane or isopentane, and also mixtures of n-pentane and isopentane.

The blowing agent component (d) is used customarily in an amount of 2 to 30 wt %, preferably 2 to 20 wt %, more preferably 2 to 15 wt %, based on the total weight of components b) to e).

In one preferred embodiment, the blowing agent mixture c) comprises exclusively hydrocarbons as physical blowing agent, more preferably in combination with the chemical blowing agent water. Particularly preferred hydrocarbons are n-pentane, cyclopentane, isopentane, and mixtures of the isomers. Used in particular is a mixture of n-pentane and isopentane as physical blowing agent c).

Catalysts e) used for producing the rigid polyurethane foams are, in particular, compounds which strongly accelerate the reaction of the component (b) compounds containing reactive hydrogen atoms, more particularly hydroxyl groups, with the polyisocyanates (a).

Usefully used are basic polyurethane catalysts, examples being tertiary amines, such as triethylamine, tributylamine, dimethylbenzylamine, dicyclohexylmethylamine, dimethylcyclohexylamine, N,N,N',N'-tetramethyldiaminodiethyl ether, bis(dimethylamino-propyl)urea, N-methyl- and N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, bis(2-dimethylaminoethyl) ether, dimethylpiperazine, N-dimethylaminoethylpiperidine, 1,2-dimethylimidazole, 1-azabicyclo[2.2.0]octane, 1,4-diazabicyclo[2.2.2]octane (Dabco), and alkanolamine compounds, such as triethanolamine, triisopropanolamine, N-methyl- and N-ethyldiethanolamine, dimethylaminoethanol, 2-(N,N-dimethylaminoethoxy)ethanol, N,N',N"-tris(dialkylaminoalkyl)hexahydrotriazines, e.g., N,N',N"-tris(dimethylaminopropyl)-s-hexahydrotriazine, and triethylenediamine. Further catalysts contemplated are as follows: amidines, such as 2,3-dimethyl-3,4,5,6-tetrahydropyrimidine, tetraalkylammonium hydroxides, such as tetramethylammonium hydroxide, alkali metal hydroxides, such as sodium hydroxide, and alkali metal alkoxides, such as sodium methoxide and potassium isopropoxide, alkali metal carboxylates, and also alkali metal salts of long-chain fatty acids having 10 to 20 carbon atoms and optionally pendant OH groups.

Preference is given to using 0.001 to 10 parts by weight, more preferably 0.01 to 7 parts by weight, especially 0.1 to 5 parts by weight of catalyst or catalyst combination, based on 100 parts by weight of component (b).

Another possibility is that of running the reaction without catalysis. In this case the catalytic activity of polyols prepared starting from amines is exploited.

Also contemplated are catalysts for the trimerization reaction of the NCO groups with one another: catalysts which form isocyanurate groups, examples being ammonium ion salts or alkali metal salts, especially ammonium or alkali metal carboxylates, alone or in combination with tertiary amines. The formation of isocyanurate leads to greater crosslinking in the foam and to a higher flame resistance than the urethane bond.

At least one basic polyurethane catalyst is preferably used, preferably from the group of the tertiary amines. Particularly preferred is the use of dimethylcyclohexylamine, triethylamine, tetramethylhexanediamine, N,N',N"-tris(dialkylaminopropyl)hexahydrotriazines, or 1,4-diazabicyclo[2.2.2]octane. More particularly the catalyst comprises dimethylcyclohexylamine. There is preferably at least one catalyst also used from the group of the trimerization catalysts, preferably ammonium ion salts or alkali metal salts, more preferably ammonium or alkali metal carboxylates. Potassium acetate especially is used as sole trimerization catalyst.

Particularly preferred for use as catalyst (e) is a catalyst mixture comprising tertiary amine as polyurethane catalyst, and a metal carboxylate or ammonium carboxylate, alkali metal carboxylate for example, as trimerization catalyst.

It is optionally possible for further auxiliaries and/or adjuvants (f) to be added to the reaction mixture for producing the rigid polyurethane foams. Examples might include surface-active substances, foam stabilizers, cell regulators, fillers, dyes, pigments, hydrolysis inhibitors, and substances with fungistatic and bacteriostatic activity.

Examples of compounds contemplated as surface-active substances, which serve to support the homogenization of the starting materials and which also, optionally, are suitable for regulating the cell structure of the plastics. Examples would include emulsifiers, such as the sodium salts of castor oil sulfates or of fatty acids, and also salts of fatty acids with amines, examples being diethylamine oleate, diethanolamine stearate, and diethanolamine ricinoleate, salts of sulfonic acids, examples being alkali metal or ammonium salts of dodecylbenzene sulfonic or dinaphthylmethanedisulfonic acid and ricinoleic acid; foam stabilizers, such as siloxane-oxalkylene copolymers and other organopolysiloxanes, ethoxylated alkylphenols, ethoxylated fatty alcohols, liquid paraffins, castor oil or ricinoleic esters, turkey red oil and peanut oil, and cell regulators, such as paraffins, fatty alcohols, and dimethylpolysiloxanes. Suitable additionally, for improving the emulsifying effect, the cell structure and/or stabilization of the foam, are the above-described oligomeric acrylates having polyoxyalkylene radicals and fluoroalkane radicals as side groups.

Fillers, especially reinforcing fillers, are the customary organic and inorganic fillers, reinforcing agents, weighting agents, agents for improving the abrasion behavior in paints, coating materials, etc., these fillers being known per se. Specific examples that may be mentioned include the following: inorganic fillers such as silicatic minerals, examples being phyllosilicates such as antigorite, serpentine, hornblends, amphiboles, chrysotile, and talc, metal oxides, such as kaolin, aluminum oxides, titanium oxides, and iron oxides, metal salts, such as chalk, heavy spar, and inorganic pigments, such as cadmium sulfide and zinc sulfide, and also glass, etc. Preference is given to using kaolin (China clay), aluminum silicate, and coprecipitates of barium sulfate and aluminum silicate, and also natural and synthetic minerals in fiber form such as wollastonite, metal fibers and especially glass fibers of various lengths, which may optionally have been sized. Examples of organic fillers contemplated include the following: carbon, melamine, rosin, cyclopentadienyl resins and graft polymers, and also cellulose fibers, fibers of polyamide, of polyacrylonitrile, of polyurethane, and of polyester, based on aromatic and/or aliphatic dicarboxylic esters, and especially carbon fibers.

The organic and inorganic fillers may be used individually or as mixtures and, if used, are added to the reaction mixture advantageously in amounts of 0.5 to 50 wt %, preferably 1 to 40 wt %, based on the weight of components (b) to (f).

Further details of the abovementioned customary auxiliaries and adjuvants (f) can be found in the technical literature, examples being the Monograph by J. H. Saunders and K. C. Frisch, "High Polymers" volume XVI, Polyurethanes, Parts 1 and 2, Interscience Publishers 1962 and 1964, respectively, or in Kunststoff-Handbuch, Polyurethane, volume VII, Hanser-Verlag, Munich, $3^{rd}$ edition, 1993.

To produce the rigid polyurethane foams, the components (a) to (f) are mixed to form a reaction mixture. Here it is possible preferably to operate by a 2-component method in which components (b), (c), (d), (e), and optionally (f) are mixed to form a polyol component, which is subsequently mixed with the polyisocyanate (a). This two-component process has proven preferable in practice. In the context of the present invention, a reaction mixture refers to the mixture of the isocyanates (a) and of the isocyanate-reactive compounds (b) at reaction conversions of less than 90%, based on the isocyanate groups.

In the method of the invention, polyisocyanates (a) and the polyol component consisting of components (b), (c), (d), (e), and optionally (f) are reacted in amounts such that the isocyanate index is in a range between 120 to 250, preferably between 160 to 230, and in particular between 180 and 220. The isocyanate index is the molar ratio of isocyanate groups to groups reactive with isocyanate groups, multiplied by 100.

The starting components are mixed at a temperature of 15 to 90° C., preferably of 20 to 60° C., more particularly of 20 to 45° C. The reaction mixture can be poured into closed supportive molds by means of high-pressure or low-pressure metering machinery. This technology is used, for example, to manufacture discrete sandwich elements.

The rigid foams of the invention are produced preferably on continuous double belt lines. In the double belt process, a high-pressure machine is used to meter the polyol component and the isocyanate component and mix them in a mixing head. Catalysts and/or blowing agents may be metered into the polyol mixture beforehand using separate pumps. The reaction mixture is applied continuously to the lower outer layer. The lower outer layer with the reaction mixture, and the upper outer layer, run into the double belt system, in which the reaction mixture foams and cures. Once the material has left the double belt system, the continuous strand is cut apart to the desired dimensions. In this way it is possible to produce sandwich elements with metallic outer layers, or insulating elements with flexible outer layers.

The rigid polyurethane foams produced by the method of the invention have a density of 0.02 to 0.75 $g/cm^3$, preferably of 0.025 to 0.24 $g/cm^3$, and more particularly of 0.03 to 0.1 $g/cm^3$. They are especially suitable as insulating material in the construction or refrigeration sector, as an interlayer for sandwich elements, for example. From experience, surface defects between foam surfaces and the lower layer running at the bottom in the double belt process occur with particular frequency during the production of relatively thin sandwich elements. In addition to the improved foam mechanics, the polyol components of the invention therefore enable a distinct improvement in the foam quality. It has proven advantageous to use the method of the invention for producing rigid polyurethane foam composite elements having a foam thickness of 20 to 200 mm, more preferably 30 to 150 mm, very preferably 30 to 100 mm, and more particularly 30 to 80 mm. This "thickness" is understood as the thickness of foam from outer layer to outer layer.

A further subject of the present invention is a rigid polyurethane foam composite element producible by a method of the invention. The rigid polyurethane foams of the invention are notable for particularly high flame retardancy and therefore allow the use of reduced amounts of flame retardants, particularly a reduced amount of toxic, halogenated flame retardants. The rigid foams of the invention preferably have a flame height of less than 15 cm according to a test in line with EN-ISO 11925-2.

The rigid PU foams of the invention, moreover, even at low molding temperatures <55° C. and without additional application of adhesion promoter, meet all of the necessary requirements for effective processing and end-product qualities: rapid foam curing, effective foam adhesion to metallic outer layers, few defects on the foam surface, high compressive strengths, and good thermal insulation capacity. Furthermore, a polyol component of the invention comprising components (b), (d), and (e) is phase-stable: in other words, even on 2 weeks of storage at 20° C., the mixture is still homogeneous and there is no phase separation.

The present invention is illustrated below with examples:

EXAMPLES

Starting Materials:

Polyether polyol 1: Polyether alcohol with a hydroxyl number of 490 mg KOH/g and an average functionality of 4.3, prepared by propoxylation of a mixture of sucrose and glycerol as starters.

Polyether polyol 2: Polyether polyol with a hydroxyl number of 188 mg KOH/g and a functionality of 2.0, prepared by ethoxylation of ethylene glycol as starter.

Polyether polyol 3: Polyether polyol with a hydroxyl number of 605 mg KOH/g and a functionality of 3.0, prepared by ethoxylation of trimethylolpropane as starter.

Polyester polyol 1: Product of esterification of terephthalic acid, diethylene glycol, oleic acid, and a trimethylolpropane ethoxylated to a hydroxyl number of 600 mg KOH/g, the product having a hydroxyl number of 245 mg KOH/g and a functionality of 2.5.

Polyester polyol 2: Product of esterification of terephthalic acid, diethylene glycol, oleic acid, and a glycerol ethoxylated to a hydroxyl number of 530 mg KOH/g, the product having a hydroxyl number of 245 mg KOH/g and a functionality of 2.5.

Mannich polyol 1: Desmophen® M530 from Covestro: Propoxylated Mannich condensate synthesized from bisphenol A, formaldehyde, and diethanolamine, having a hydroxyl number of 530 mg KOH/g and an average functionality of 3.0.

Mannich polyol 2: Rokopol® RF 151 from PCC Rokita: Propoxylated Mannich condensate synthesized from nonylphenol, formaldehyde, and diethanolamine, having a hydroxyl number of 450 mg KOH/g.

TCPP: Tris(2-chloroisopropyl) phosphate

TEP: Triethyl phosphate

Niax® L 6635: Silicone-containing foam stabilizer from Momentive

Catalyst A: Trimerization catalyst consisting of 47 wt % of potassium acetate in solution in monoethylene glycol Catalyst B: Dimethylcyclohexylamine Pentane S 80/20: Mixture of 80 wt % n-pentane and 20 wt % isopentane.

Lupranat® M50: Polymeric methylenediphenyl diisocyanate (PMDI), with a viscosity of around 500 mPa*s at 25° C.

In the production of the rigid polyurethane foam composite elements 50 mm, 100 mm, and 170 mm thick in the double belt process, the polyol components shown in table 1 and conditioned to 20±1° C. were reacted with Lupranat® M50, which was likewise conditioned at 20±1° C. The amount of Lupranat® M50 was always selected such that all of the rigid foams produced had an isocyanate index of 200±10.

For producing the composite elements, the lower outer layer used was an aluminum foil with a thickness of 0.05 mm, heated to 35±2° C., and an aluminum sheet with slight profiling, 0.5 mm thick and heated to 37±1° C. The temperature of the double belt was always 50±1° C.

To produce the composite elements 50 mm thick, the amount of catalyst B and water was selected such that the gel time of the reaction mixture was exactly 25 seconds and the contact time of the reaction mixture with the upper belt was exactly 20 seconds, and the foam had an overall density of 36.5±1 g/l.

To produce the composite elements 100 mm thick, the amount of catalyst B and water was selected such that the gel time of the reaction mixture was exactly 30 seconds and the contact time of the reaction mixture with the upper belt was exactly 24 seconds, and the foam likewise had an overall density of 36.5±1 g/l.

To produce the composite elements 170 mm thick, the amount of catalyst B and water was selected such that the gel time of the reaction mixture was exactly 35 seconds and the contact time of the reaction mixture with the upper belt was exactly 29 seconds, and the foam had an overall density of 36.5±1 g/l.

Based on components a) to f), all formats were processed with a pentane S 80/20 fraction of 1.8 wt %.

taken from the samples, using a band saw. The test specimens were taken at identical locations distributed over the width of the element (left, center, right), and the transverse tensile strength of the foam, or the adhesion to the outer layer, was determined in accordance with the sandwich standard DIN EN ISO 14509-A.1 according to EN 1607.

Determination of Compressive Strength:

Further test specimens with dimensions of 100 mm×100 mm×sandwich thickness (50 mm, 100 mm, 170 mm) were taken from the samples, using a band saw. The test specimens were taken at identical locations distributed over the width of the element (left, center, right), and the compressive strength of the foam was determined in accordance with the sandwich standard DIN EN ISO 14509-A.2 according to EN 826.

Assessment of Foam Surface after Removal of the Lower Outer Layers:

Following mechanical removal of the aluminum foil and of the aluminum sheets, to which the liquid reaction mixture is applied directly in the double belt process (lower outer layer), the foam surfaces were assessed visually and rated, with rating 1 denoting the best foam surface and rating 5 denoting the poorest foam surface:

TABLE 1

|  | Comparative example 1 | Inventive example 1 | Comparative example 2 | Inventive example 2 | Comparative example 3 | Inventive example 3 |
|---|---|---|---|---|---|---|
| Polyether polyol 1 [parts by wt.] | 28.2 | 28.2 | 28.2 | 28.2 | 24.5 | 24.5 |
| Polyether polyol 2 [parts by wt.] | 5.5 | 5.5 | 5.5 | 5.5 |  |  |
| Polyether polyol 3 [parts by wt.] |  |  |  |  | 5.5 | 5.5 |
| Polyester polyol 1 [parts by wt.] |  |  | 38.3 | 28.3 |  |  |
| Polyester polyol 2 [parts by wt.] | 38.3 | 28.3 |  |  | 38.5 | 28.5 |
| Mannich polyol 1 [parts by wt.] |  | 10.0 |  | 10.0 |  |  |
| Mannich polyol 2 [parts by wt.] |  |  |  |  |  | 10.0 |
| TCPP [parts by wt.] | 24.5 | 24.5 | 24.5 | 24.5 | 24.0 | 24.0 |
| TEP [parts by wt.] |  |  |  |  | 3.5 | 3.5 |
| Niax L6635 [parts by wt.] | 2.5 | 2.5 | 2.5 | 2.5 | 2.5 | 2.5 |
| Catalyst A [parts by wt.] | 1.0 | 1.0 | 1.0 | 1.0 | 1.0 | 1.0 |
| Pentane S 80/20 | 1.8 | 1.8 | 1.8 | 1.8 | 1.8 | 1.8 |
| Element thickness [mm] | 50 | 50 | 100 | 100 | 170 | 170 |

For all of the inventive and comparative examples, samples with a length of 2.0 m and a width of 1.25 m were taken. The properties described below were determined on these samples.

These properties were determined as follows:

Determination of Transverse Tensile Strength:

Further test specimens with dimensions of 100 mm×100 mm×sandwich thickness (50 mm, 100 mm, 170 mm) were

|  | Aluminum foil | Profiled sheet |
|---|---|---|
| Rating 1 | Visually flawless (velvet skin) | Visually flawless (velvet skin) |
| Rating 2 | Small areas lacking conformity | Small areas lacking conformity |
| Rating 3 | Void depth: <0.2 cm | Void depth: <0.2 cm |

-continued

|  | Aluminum foil | Profiled sheet |
|---|---|---|
| Rating 4 | Void depth: 0.3-0.6 cm | Void depth: 0.3-0.6 cm |
| Rating 5 | Void depth: >0.6 cm | Void depth: >0.6 cm |

TABLE 2

|  | Comparative example 1 | Inventive example 1 | Comparative example 2 | Inventive example 2 | Comparative example 3 | Inventive example 3 |
|---|---|---|---|---|---|---|
| Overall density [g/l] | 36.2 | 35.8 | 36.1 | 36.4 | 37.1 | 36.3 |
| Pressure [N/mm$^2$] | 0.115 | 0.147 | 0.118 | 0.161 | 0.121 | 0.157 |
| Tensile [N/mm$^2$] | 0.09 | 0.17 | 0.13 | 0.17 | 0.08 | 0.12 |
| Sheet surface | 6 | 4 | 2 | 1 | 1 | 1 |
| Foil surface | 5 | 3 | 2 | 2 | 1 | 1 |

The results in table 2 show that the tensile strengths of the foams produced in accordance with the inventive examples are much higher than those of the corresponding comparative examples. Additionally, the foams from all inventive examples exhibit significantly better compressive strength in comparison to the foams from all comparative examples.

Furthermore, the surface quality with respect to both outer layers (aluminum foil and profiled sheet) is significantly improved in the foam from inventive example 1 relative to the foam from comparative example 1. Relative to the foam from comparative example 2, as well, the foam from inventive example 2 displays qualitative advantages at the interface with the profile sheet. From experience, surface defects between foam surfaces and the outer layer running at the bottom in the double belt process occur with particular frequency during the production of relatively thin sandwich elements. The polyol components of the invention, described by way of example using inventive examples 1, 2, and 3, therefore make it possible to achieve not only improved foam mechanics but also a significant improvement in foam quality, especially in the case of processing to form rigid foam composite elements having thicknesses ≤100 mm.

What is claimed is:

1. A method for producing rigid polyurethane foam composite elements comprising at least one outer layer and a rigid polyurethane foam layer, the method comprising
forming a reaction mixture by mixing
(a) polyisocyanates with
(b) compounds having at least two hydrogen atoms reactive with isocyanate groups,
(c) optionally flame retardant(s),
(d) blowing agent, comprising at least one aliphatic or cycloaliphatic hydrocarbon having 4 to 8 carbon atoms,
(e) catalyst, and
(f) optionally auxiliaries and adjuvants,
applying the reaction mixture to the at least one outer layer, and
curing the reaction mixture to form the rigid polyurethane foam layer, wherein
component (b) comprises at least one polyether alcohol (b1), prepared by alkoxylation of a starter or of a starter mixture, wherein the at least one polyether alcohol (b1) has an average functionality of 4 to 8 and a hydroxyl number of 300 to 600 mg KOH/g, at least one aromatic Mannich condensate (b2), which may have been alkoxylated, preparable by reaction of an aromatic compound which on an aromatic ring carries at least one hydroxyl group and/or at least one group —NHR, where R is any organic radical or is hydrogen, one or more aldehydes and/or ketones, and one or more primary or secondary amines, at least one aromatic polyester polyol (b3), and optionally chain extenders and/or crosslinking agents,
wherein a fraction of aromatic Mannich condensate is greater than 5 wt % to less than 20 wt %, based on a total weight of component (b),
wherein an isocyanate index on mixing of components a) to f) is 160 to 230; and
wherein the blowing agent (d) comprises physical blowing agents and optionally chemical blowing agents and wherein the physical blowing agent comprises exclusively hydrocarbons as physical blowing agent.

2. The method according to claim 1, wherein the compounds (b) having at least two hydrogen atoms reactive with isocyanate groups comprise chain extenders and/or crosslinking agents (b4).

3. The method according to claim 1, wherein the compounds (b) having at least two hydrogen atoms reactive with isocyanate groups comprise at least one polyether alcohol (b5) having an average functionality of 2 to 4 and a hydroxyl number in a range from 100 to less than 300 mg KOH/g.

4. The method according to claim 1, wherein the compounds (b) having at least two hydrogen atoms reactive with isocyanate groups comprise 20 to 60 wt % of one or more polyether alcohols (b1), greater than 5 to less than 20 wt % of one or more aromatic Mannich condensates in alkoxylated or unalkoxylated form (b2), 20 to 60 wt % of an aromatic polyester polyol (b3), and 0 to 15 wt % of chain extenders and/or crosslinking agents (b4) and 0 to 15 wt % of polyether alcohol (b5) having an average functionality of 2 to 4 and a hydroxyl number in a range from 100 to less than 300 mg KOH/g, based in each case on a total weight of components (b1) to (b5).

5. The method according to claim 1, wherein the compounds (b) having at least two hydrogen atoms reactive with isocyanate groups have a hydroxyl number of 150 to 350 mg KOH/g.

6. The method according to claim 1, wherein the aromatic Mannich condensate (b2) is 1,2-propoxylated and has a hydroxyl number of 200 to 650 mg KOH/g.

7. The method according to claim 1, wherein the aromatic polyester polyol (b3) is obtained by esterification of dicarboxylic acids or derivatives thereof, selected from the group consisting of phthalic acid, phthalic acid derivatives, isophthalic acid, isophthalic acid derivatives, terephthalic acid, terephthalic acid derivatives, or mixtures thereof, at least one dialcohol, and at least one fatty acid.

8. The method according to claim 1, wherein the aromatic polyester polyol (b3) has an OH functionality of greater than 2 to less than 4 and a hydroxyl number of 200 to 400 mg KOH/g.

9. The method according to claim 1, wherein the polyisocyanates (a) comprise one or more isocyanates selected from the group consisting of 2,2'-MDI, 2,4'-MDI, 4,4'-MDI and oligomers of MDI.

10. The method according to claim 1, wherein the catalyst (e) comprises a metal carboxylate or ammonium carboxylate.

11. The method according to claim 1, wherein the rigid polyurethane foam composite elements are produced continuously by a double belt process.

12. The method according to claim 1, wherein the rigid polyurethane foam composite elements have a thickness of 30 to 100 mm.

13. A rigid polyurethane foam composite element obtainable by a method according to claim 1.

* * * * *